(12) United States Patent
Weissberger et al.

(10) Patent No.: US 6,717,917 B1
(45) Date of Patent: Apr. 6, 2004

(54) METHOD OF DETERMINING REAL-TIME DATA LATENCY AND APPARATUS THEREFOR

(75) Inventors: Joel Weissberger, Northridge, CA (US); Mark McWhirter, Simi Valley, CA (US); Manley Klassen, Ventura, CA (US); Errol Ginsberg, Malibu, CA (US)

(73) Assignee: Ixia, Calabasas, CA (US)

( * ) Notice: Subject to any disclaimer, the term of this patent is extended or adjusted under 35 U.S.C. 154(b) by 734 days.

(21) Appl. No.: 09/591,092

(22) Filed: Jun. 9, 2000

(51) Int. Cl.[7] .................................................. H04J 3/14
(52) U.S. Cl. ...................................... 370/252; 709/224
(58) Field of Search ................................ 370/241, 252, 370/253, 517, 519; 709/224; 714/47, 55, 819

(56) References Cited

U.S. PATENT DOCUMENTS

| | | | |
|---|---|---|---|
| 5,600,632 A | * | 2/1997 | Schulman .................... 370/252 |
| 5,878,032 A | * | 3/1999 | Mirek et al. ................. 370/252 |
| 6,172,989 B1 | * | 1/2001 | Yanagihara et al. ......... 370/473 |
| 6,363,056 B1 | * | 3/2002 | Beigi et al. .................. 370/252 |
| 6,545,979 B1 | * | 4/2003 | Poulin ...................... 370/241.1 |
| 6,601,098 B1 | * | 7/2003 | Case et al. ................... 709/224 |

* cited by examiner

*Primary Examiner*—Min Jung
(74) *Attorney, Agent, or Firm*—SoCal IP Law Group; Steven C. Sereboff; Mark A. Goldstein

(57) ABSTRACT

A method of and an electronic apparatus for determining real-time data latency are disclosed. The method may include creating a plurality of outgoing data packets having an outgoing time stamp, a group identifier and validation information. The outgoing data packets may be transmitted onto a network. A plurality of incoming data packets may be received over the network. The incoming data packets may be validated. For each of the incoming data packets that is valid, a round-trip time delay for the incoming data packet may be calculated, and statistics for the incoming data packets may be updated based on the round-trip time delay and the group identifier included in the incoming data packet. The method may be implemented on an electronic apparatus.

39 Claims, 7 Drawing Sheets

(c) 2000 Ixia (c) 2000 Ixia (c) 2000 Ixia (c) 2000 Ixia (c) 2000 Ixia

US 6,717,917 B1

METHOD OF DETERMINING REAL-TIME DATA LATENCY AND APPARATUS THEREFOR

RELATED APPLICATION

Related subject matter is disclosed in U.S. patent application Ser. No. 09/591,080 filed on Jun. 9, 2000, entitled Method of Determining Time Delay for Round-Trip Transmission of Data and Electronic Apparatus Therefor assigned to the same assignee hereby incorporated by reference.

FIELD OF THE INVENTION

This invention relates, in-general, to data transmission, and more particularly, to methods of determining real-time data latency and apparatuses therefor.

BACKGROUND OF THE INVENTION

A user accessing a computer server across a computer network must transmit data across the computer network from the user's computer to the computer server and must also receive data across the computer network from the computer server to the user's computer. Therefore, the user requires fast data transmission rates across the computer network and requires, in particular, fast round-trip data transmission across the computer network. However, as computer networks continuously grow in size and complexity, the data transmission rates associated with the larger and more complex computer networks may decrease. Accordingly, a need exists for a method of determining real-time data latency and an apparatus therefor.

SUMMARY OF THE INVENTION

In accordance with the principles of the invention, a method of determining real-time data latency can include transmitting a first plurality of data packets, each having a first packet group identification (PGID) and a time stamp, receiving a set of data packets, identifying PGIDs in the set of data packets, identifying time stamps in the set of data packets, using the time stamps to determine time delays for the set of data packets, comparing the time delays of the set of data packets having the first PGID to a first minimum time delay, comparing the time delays of the set of data packets having the first PGID to a first maximum time delay, summing a number of data packets in the set of data packets having the first PGID as a first total count, and summing the time delays of the set of data packets having the first PGID as a first total time delay.

Further, in accordance with the principles of the invention; an electronic apparatus for determining real-time data latency can include a data packet reception portion, a data packet signature verification portion coupled to the data packet reception portion, a data packet validity verification portion coupled to the data packet reception portion, a data packet packet group identification (PGID) identification portion coupled to the data packet reception portion, a statistic array retrieval portion coupled to the data packet signature verification portion, the data packet validity verification portion, and the data packet PGID identification portion, a time delay determination and statistics portion coupled to the statistic array retrieval portion and the data packet reception portion, and a statistic array storage portion coupled to the time delay determination and statistics portion and the data packet PGID identification portion.

BRIEF DESCRIPTION OF THE DRAWING

The invention will be better understood from a reading of the following detailed description, taken in conjunction with the accompanying drawing figures in which.

For simplicity and clarity of illustration, the same reference numerals in different figures denote the same elements, and descriptions and details of well-known features and techniques are omitted to avoid unnecessarily obscuring the invention.

Furthermore, the terms first, second, third, fourth, and the like in the description and in the claims, if any, are used for distinguishing between similar elements and not necessarily for describing a sequential or chronological order. However, it is understood that the embodiments of the invention described herein are capable of operation in other sequences than described or illustrated herein. It is further understood that the terms so used are interchangeable under appropriate circumstances.

DETAILED DESCRIPTION

Figure 1:
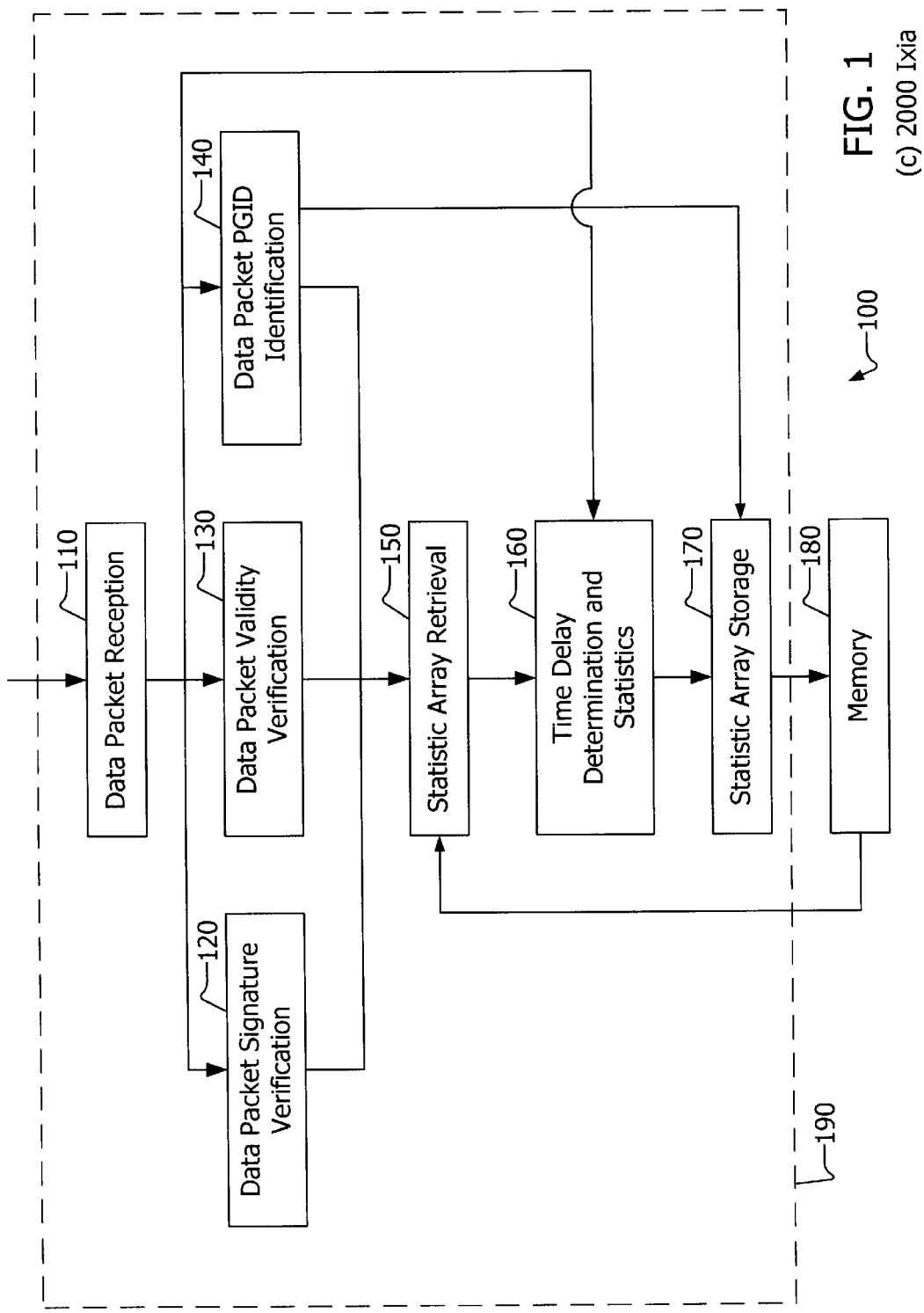
FIG. 1 illustrates a block diagram of an electronic apparatus for determining real-time data latency in accordance with an embodiment of the invention.

FIG. 1 illustrates a block diagram of a portion of an electronic apparatus 100 for determining real-time data latency. Apparatus 100 includes a data packet reception portion 110, a data packet signature verification portion 120, a data packet validity verification portion 130, a data packet Packet Group IDentification (PGID) identification portion 140, a statistic array retrieval portion 150, a time delay determination and statistics portion 160, a statistic array storage portion 170, and a memory portion 180. Data packet reception portion 110 is coupled to data packet signature verification portion 120, data packet validity verification portion 130, data packet PGID identification portion 140, and time delay determination and statistics portion 160. Statistic array retrieval portion 150 is coupled to data packet signature verification portion 120, data packet validity verification portion 130, data packet PGID identification portion 140, time delay determination and statistics portion 160, and memory portion 180. Statistic array storage portion 170 is coupled to time delay determination and statistics portion 160 and memory portion 180. In the preferred embodiment, memory portion 180 is a Dynamic Random Access Memory (DRAM). Also in the preferred embodiment, data packet reception portion 110, data packet signature verification portion 120, data packet validity verification portion 130, data packet PGID identification portion 140, statistic array retrieval portion 150, time delay determination and statistics portion 160, and statistic array storage portion 170 are located within a Field Programmable Gate Array (FPGA), as indicated by a dashed line 190 in FIG. 1.

A general description of the operation of apparatus 100 is as follows. Data packet reception portion 110 receives incoming data packets from a computer network. Data packet signature verification portion 120 verifies signatures in the received data packets. Data packet validity verification portion 130 verifies a validity of the received data packets. Data packet PGID identification portion 140 identifies PGIDs in the received data packets. Statistic array retrieval portion 150 retrieves statistics stored in memory portion 180. Time delay determination and statistics portion 160 determines time delays for the received data packets, compares the time delays to the stored statistics, and, if necessary, updates the statistics. Statistic array storage portion 170 stores the updated statistics in memory portion 180. A more detailed description of the operation of apparatus 100 is described with reference to the subsequent drawing figures.

Figure 2:
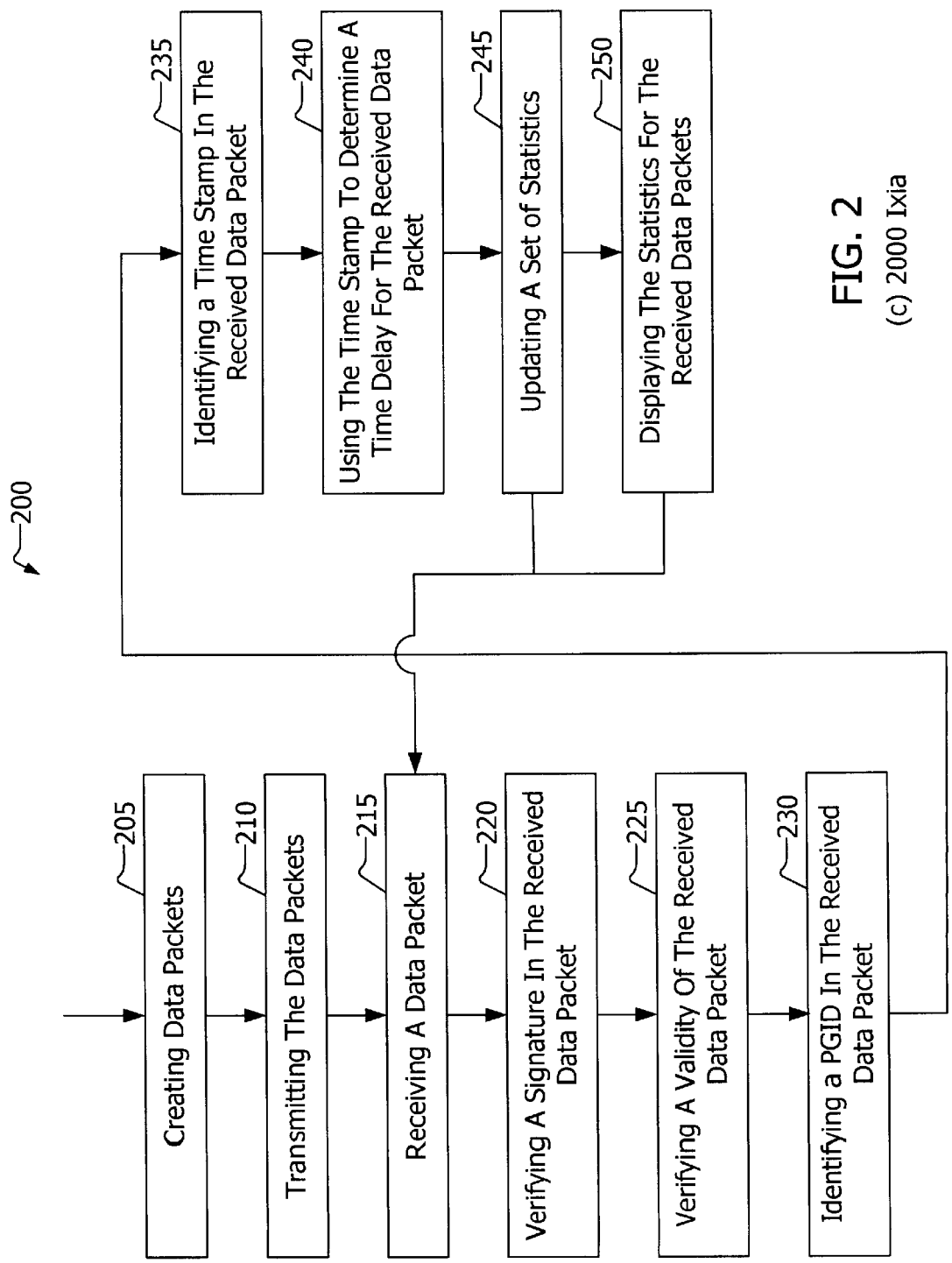
FIG. 2 illustrates a flow chart for a method of determining real-time data latency in accordance with an embodiment of the invention.

FIG. 2 illustrates a flow chart for a method 200 of determining real-time data latency. At a step 205 of method 200, data packets are created by a first electronic apparatus. Each data packet has a time stamp indicating a time when the data packet is transmitted from or out of the first electronic apparatus. Each data packet also includes a signature located at a signature offset within the data packet. The signature offset is the same for all data packets. As an example, the signature can be a unique string of 32 bits indicating that the data packet was transmitted from the first electronic apparatus. Each data packet has a size that is within a predetermined range. In the preferred embodiment for Ethernet networks, the minimum size for any data packet is 64 Bytes, and the maximum size for any data packet is 1518 Bytes. The data packets can have other sizes for non-Ethernet networks.

The data packets are grouped into one or more sets. Each data packet within a particular group or set has a PGID that is unique to that particular group and is different from the PGIDs of other data packets in other groups. The PGID can be a user-defined unique string of 16 bits. As an example, the PGIDs can represent different Internet Protocol (IP) addresses, different IP priorities, different data packet sizes, or different protocol mixes. The PGID within each data packet is located at a PGID offset within the data packet. The PGID offset is the same for all data packets. The PGID offset can be larger than or smaller than the signature offset. Each data packet within a particular group having a particular PGID can have different sizes. As an example, the different sizes may be the result of the data packets having different data patterns.

At a step 210 of method 200, the first electronic apparatus transmits the data packets out of the first electronic apparatus during a first time period. The data packets are sent to a second electronic apparatus, which receives the data packets. This second electronic apparatus takes portions of the data packets and inserts them into new data packets. As an example, the time stamps of the data packets are inserted into the new data packets. The second electronic apparatus transmits the new data packets back to the first electronic apparatus. Step 210 can be performed continuously during all of the subsequent steps of method 200.

Next, the first electronic apparatus receives these new data packets during a second time period, which is different from the first time period of step 205. However, this second time period may overlap the first time period. At a step 215 of method 200, the first electronic apparatus receives a single one of the new data packets. As an example, data packet reception portion 110 of apparatus 100 in FIG. 1 can perform step. 215 in FIG. 2.

At a step 220 of method 200 in FIG. 2, the first electronic apparatus verifies or checks the signature in the received data packet of step 215. Subsequently, at a step 225 of method 200, the first electronic apparatus verifies or checks the validity of the received data packet of step 215. The sequence of steps 220 and 225 can be reversed. Details of steps 220 and 225 are provided hereinafter with respect to FIG. 3 and FIG. 4, respectively. As an example, data packet signature verification portion 120 of apparatus 100 in FIG. 1 can perform step 220 in FIG. 2, and data packet validity verification portion 130 of apparatus 100 in FIG. 1 can perform step 225 of FIG. 2.

At a step 230 in method 200, the first electronic apparatus identifies a PGID in the received data packet of step 215. The PGID in the received data packet is located at the same PGID offset as used previously in step 205. The sequence of steps 220, 225, and 230 may be altered or reversed. As an example, data packet PGID identification portion 140 of apparatus 100 in FIG. 1 can perform step 230 in FIG. 2.

Next, at a step 235 in method 200, the first electronic apparatus identifies a time stamp in the received data packet of step 215. Time stamps in the received data packet originates from a time stamp in one of the transmitted data packets of steps 205 and 210. In other words, the time stamp of the received data packet indicates the time at which the source or original data packet was transmitted from the first electronic apparatus at step 210. As an example, time delay determination and statistics portion 160 of apparatus 100 in FIG. 1 can perform step 235 in FIG. 2.

At a step 240 of method 200, the first electronic apparatus uses the time stamp of the received data packet of step 215 to determine a time delay or latency for the received data packet. In particular, the first electronic apparatus subtracts the time indicated by the time stamp from the time at which the data packet was received by the first electronic apparatus in step 215. This time delay represents a round-trip time delay for the data packet. As an example, time delay determination and statistics portion 160 of apparatus 100 in FIG. 1 can perform step 240 of FIG. 2.

At a step 245 of method 200, the first electronic apparatus updates a set of statistics with the time delay and other statistics from the received data packet. In particular, the first electronic apparatus updates a particular set of statistics for the PGID contained in the received data packet. The details of step 245 are explained hereinafter with respect to FIGS. 5 and 6. As an example, statistic array retrieval portion 150, time delay determination and statistics portion 160, and statistic array storage portion 170 of apparatus 100 in FIG. 1 can be used to perform step 245 of FIG. 2.

Next, steps 215, 220, 225, 230, 235, 240, and 245 can be repeated numerous times. Additional data packets having the same PGID as the first received data packet can be received, and the set of statistics for the same PGID can be successively updated. Other data packets having a PGID different from that of the first received data packet can be received, and another set of statistics for this different PGID can be successively updated. For a particular received data packet, step 215 can be performed while performing steps 220, 225, 230, and 235 and before receiving a subsequent data packet. Also for a particular received data packet, steps 240 and 245 can be performed after terminating step 215 and can be performed before or while receiving the next data packet.

After repeating steps 215, 220, 225, 230, 235, 240, and 245 for a predetermined period of time, a step 250 of method 200 is performed. At step 250, the first electronic apparatus displays the statistics for the received data packets. Steps 215, 220, 225, 230, 235, 240, and 245 can be repeated or performed continuously while performing step 250.

Figure 7:
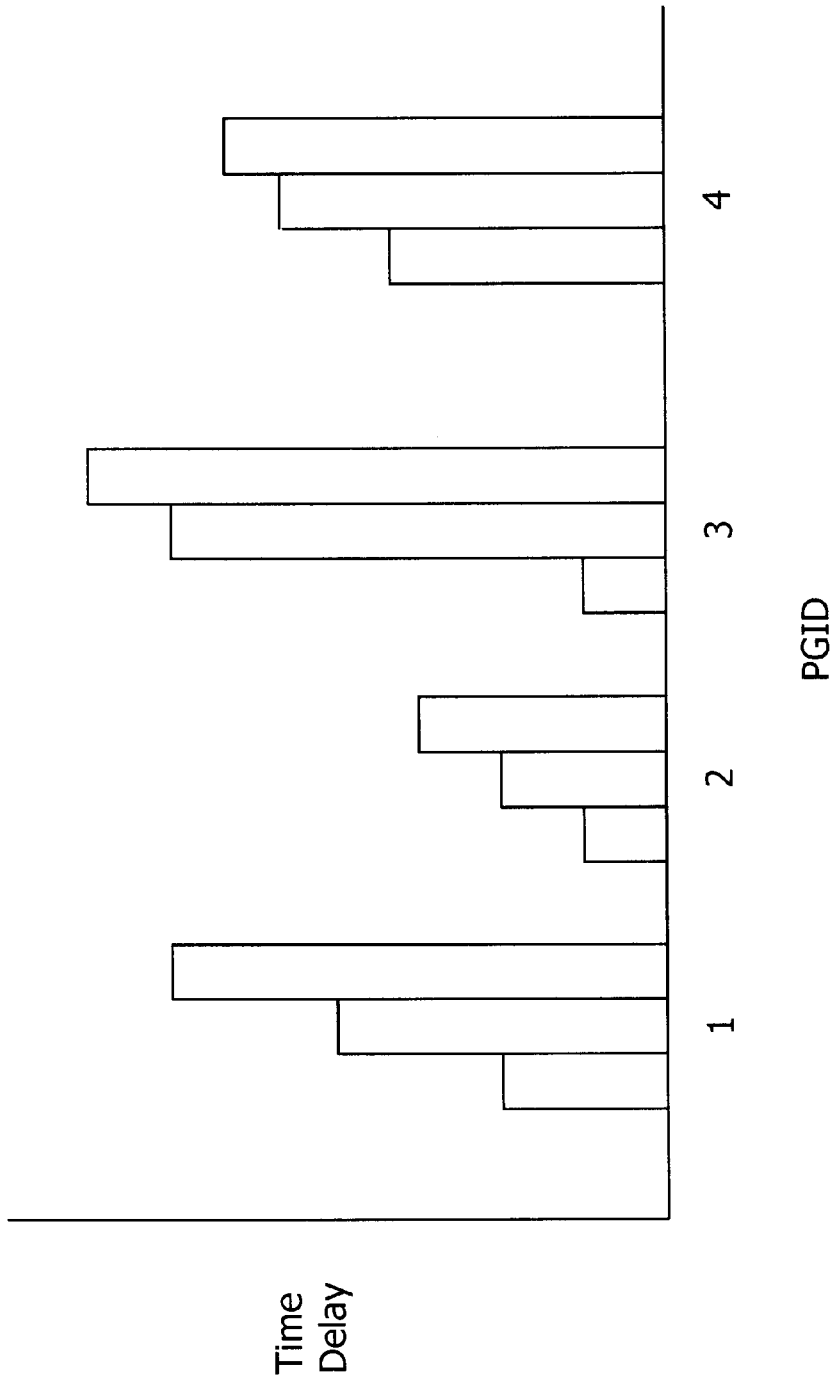
FIG. 7 illustrates a graph of the statistics generated by the method of FIG. 2 in accordance with an embodiment of the invention.

As an example of different statistical displays of step 250 in method 200, FIG. 7 illustrates a graph of instantaneous latency determined by method 200 in FIG. 2. The graph in FIG. 7 has an X-axis or horizontal axis representing the different PGIDs of the received data packets. The graph also has a Y-axis or vertical axis representing a magnitude of the time delay or latency in the round-trip transmission of the data packets. The graph in FIG. 7 illustrates four different PGIDs, each having a minimum time delay, an average time delay, and a maximum time delay over a specific instance in time.

Figure 3:
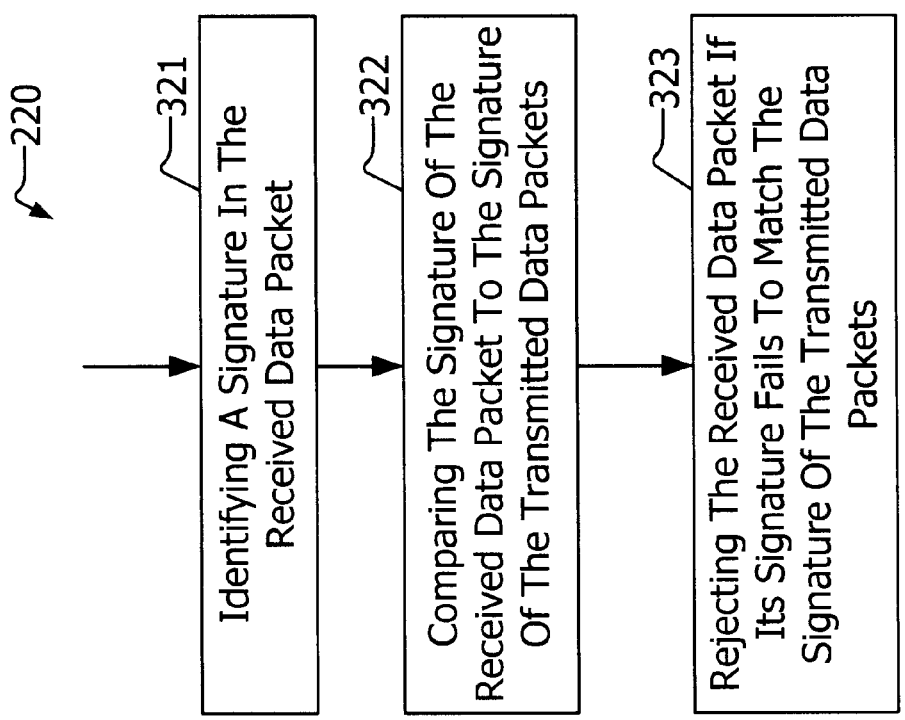
FIGS. 3 through 6 illustrate flow charts of detailed portions of the method of FIG. 2 in accordance with an embodiment of the invention.

FIG. 3 illustrates a flow chart of a detailed portion of method 200 in FIG. 2. In particular, FIG. 3 illustrates additional details of step 220 in FIG. 2. At a step 321 in FIG. 3, the first electronic apparatus identifies a signature in the received data packet of step 215 in FIG. 2. The signature in the received data packet is located at a signature offset within the received data packets. This signature offset is the same offset as the signature offset used in step 205 of FIG. 2. At a step 322 of FIG. 3, the first electronic apparatus compares the signature of the received data packet to the signature of the created and transmitted data packets in steps 205 and 210 of FIG. 2. At a step 323 of FIG. 3, the first electronic apparatus rejects the received data packet if its signature fails to match the signature of the transmitted data packets. If a received data packet is rejected during step 323, the rejected data packet is immediately discarded and is not processed any further in method 200. Accordingly, after rejecting a received data packet during step 323, method 200 continues by receiving another data packet during step 215 of FIG. 2.

Figure 4:
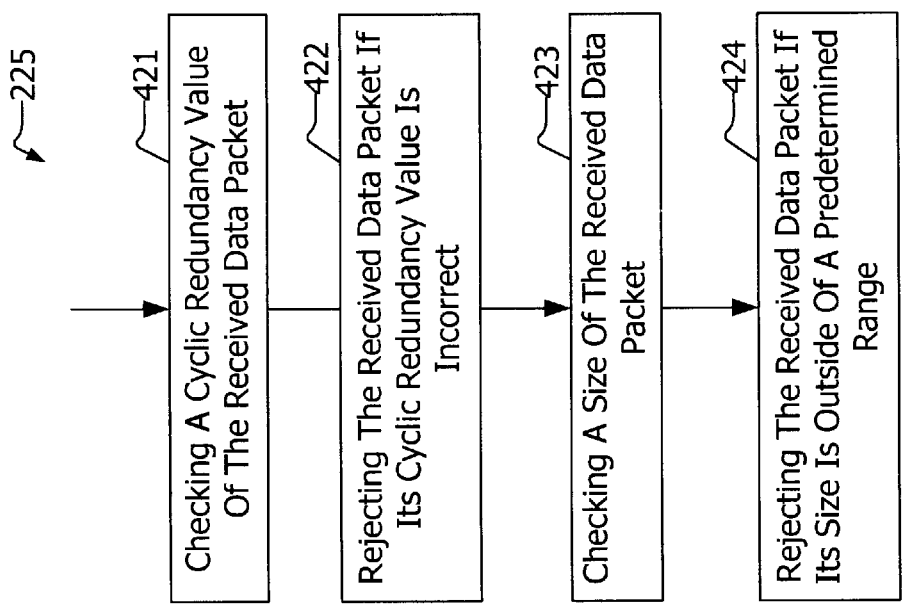

FIG. 4 illustrates a flow chart of a different detailed portion of method 200 in FIG. 2. In particular, FIG. 4 illustrates additional details of step 225 of FIG. 2. At a step 421 of FIG. 4, the first electronic apparatus checks a Cyclic Redundancy Check (CRC) value of the received data packet. To perform step 421, the first electronic apparatus calculates a CRC value for the received data packet, and identifies a CRC value in the received data packet. Then, the first electronic apparatus compares the calculated CRC value to the CRC value in the received data packet. At a step 422 of FIG. 4, the first electronic apparatus rejects the received data packet if its CRC value is incorrect. An incorrect CRC value indicates an invalid data packet. If a received data packet is rejected during step 422, the rejected data packet is immediately discarded and is not processed any further in method 200. Accordingly, after rejecting a received data packet during step 422, method 200 continues by receiving another data packet during step 215 of FIG. 2.

If the received data packet is not rejected during step 422 of FIG. 4, step 225 continues by performing a step 423 in FIG. 4. At step 423, the first electronic apparatus calculates the size of the received data packet and compares the calculated size to a predetermined range of sizes. At a step 424, the first electronic apparatus rejects the received data packet if its calculated size is outside of the predetermined range described earlier with respect to step 205 in FIG. 2. A size outside of the predetermined range of sizes indicates an invalid data packet. If a received data packet is rejected during step 424, the rejected data packet is immediately discarded and is not processed any further in method 200. Accordingly, after rejecting a received data packet during step 424, method 200 continues by receiving another data packet during step 215 of FIG. 2.

Figure 5:
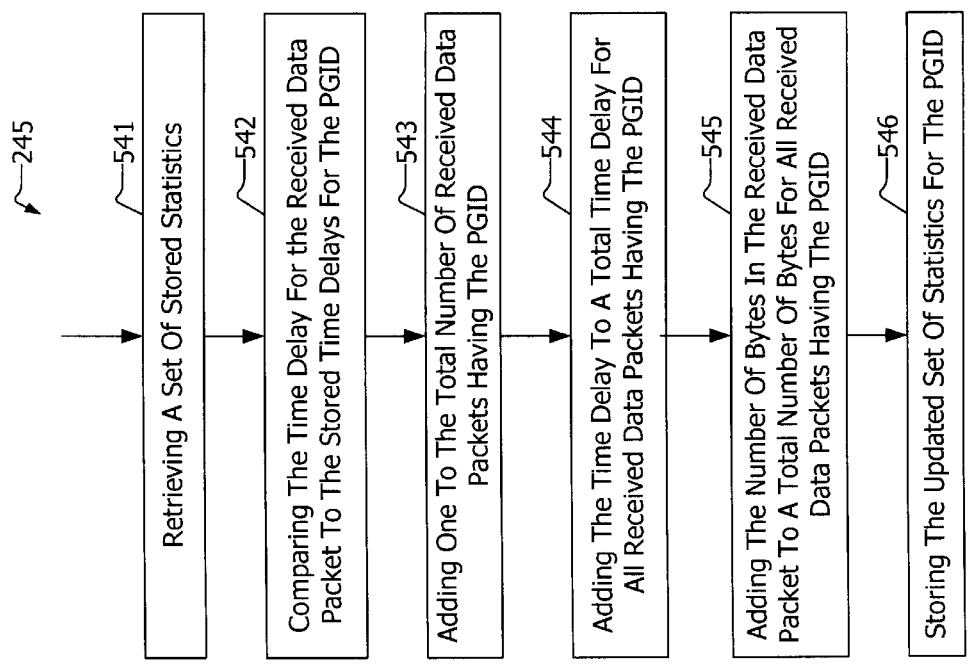

FIG. 5 illustrates a flow chart of an additional detailed portion of method 200 in FIG. 2. In particular, FIG. 5 illustrates additional details of step 245 in FIG. 2. At a step 541 in FIG. 5, the first electronic apparatus retrieves a set of stored statistics, for the PGID contained in the received data packet of step 215 in FIG. 2. As an example, the set of stored statistics can be retrieved from memory portion 180 in FIG. 1. The set of stored statistics can include a minimum time delay, a maximum time delay, a total number of received data packets having the PGID, a total time delay for all of the received data packets having the PGID, and a total number of bytes or byte count for all of the received data packets having the PGID. The set of stored statistics reflects the statistics for only those received data packets having the same PGID.

The PGID of the received data packet is used to perform step 541. For example, the set of statistics is retrieved from a first array located at a first memory address in a memory portion. The first memory address in the memory portion is identified by the PGID of the received data packet.

Next, at a step 542 in FIG. 5, the first electronic apparatus compares the time delay determined during step 240 of FIG. 2 to time delays in the set of stored statistics retrieved during step 541. Additional details of step 542 are explained hereinafter with respect to FIG. 6. Then, at a step 543 in FIG. 5, the first electronic apparatus increases by one the total count or number of received data packets in the set of statistics. At a step 544, the first electronic apparatus adds the time delay determined during step 240 of FIG. 2 to the total time delay in the set of statistics. At a step 545 of FIG. 5, the first electronic apparatus calculates the number of bytes in the received data packet and adds this number to the total number of bytes or byte count in the set of statistics. The sequence of steps 542, 543, 544, and 545 can be altered or reversed.

Next, at a step 546, the first electronic apparatus stores the updated set of statistics. The PGID of the received data packet is used to perform step 546. For example, the set of statistics is stored back into the first array located at the first memory address in the memory portion. The first memory address in the memory portion is identified by the PGID of the received data packet.

The first electronic apparatus uses the updated set of statistics to perform step 250 in FIG. 2. For example, to display or graph the minimum time delay for a PGID, the first electronic apparatus displays or graphs the minimum time delay stored in the updated set of statistics for the PGID. As an additional example, to display or graph the maximum time delay for a PGID, the first electronic apparatus displays or graphs the maximum time delay stored in the updated set of statistics for the PGID. Furthermore, to display or graph the average time delay for a PGID, the first electronic apparatus divides the first total time delay in the set of statistics by the first total count in the set of statistics.

Figure 6:
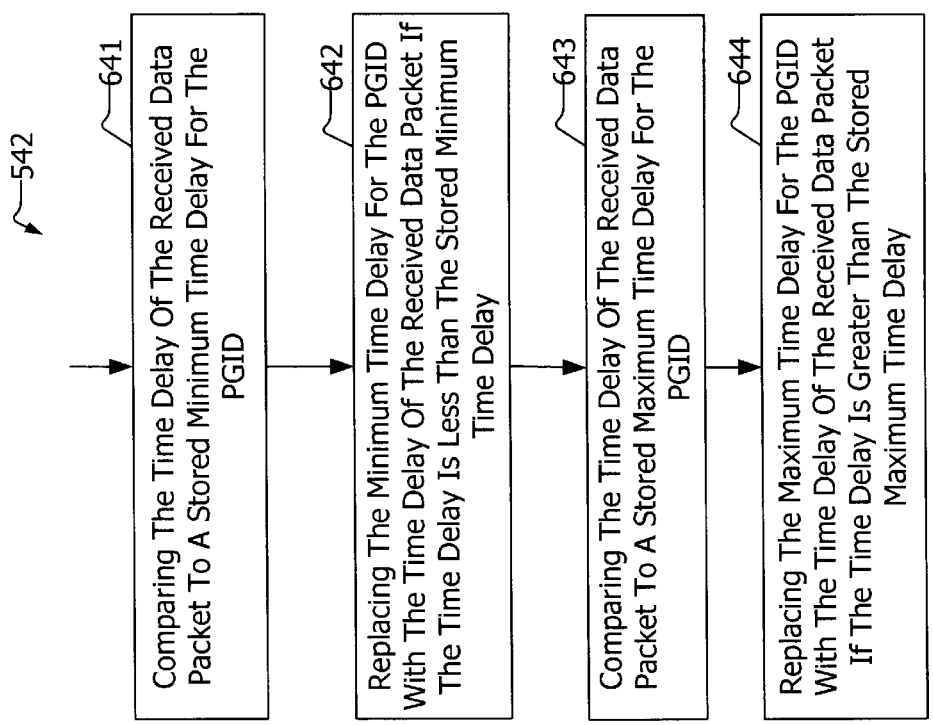

FIG. 6 illustrates a flow chart of additional details for step 542 of FIG. 5. At a step 641 in FIG. 6, the first electronic apparatus compares the calculated time delay for the received data packet to a minimum time delay in the retrieved set of statistics of step 541 in FIG. 5. At a step 642 of FIG. 6, the first electronic apparatus replaces the minimum time delay in the retrieved set of statistics with the-calculated time delay for the received data packet if the calculated time delay is less than the minimum time delay in the retrieved set of statistics. At a step 643 of FIG. 6, the first electronic apparatus compares the time delay of the received data packet to a maximum time delay in the retrieved set of statistics of step 541 in FIG. 5. At a step 644 of FIG. 6, the first electronic apparatus replaces the maximum time delay in the retrieved set of statistics with the calculated time delay for the received data packet if the calculated time delay is greater than the maximum time delay in the retrieved set of statistics. The calculated time delay is preferably not stored individually in the memory portion unless the calculated time delay is a maximum or minimum time delay for the particular PGID.

Therefore, an improved method of determining real-time data latency and an apparatus therefor is provided to overcome the disadvantages of the prior art. The method enables the detection of an increase or decrease in the time delay for the round-trip transmission of data across a computer network.

Although the invention has been described with reference to specific embodiments, it will be understood by those skilled in the art that various changes may be made without departing from the spirit or scope of the invention. For instance, the numerous details set forth herein such as, for example, the specific sequence of steps are provided to facilitate the understanding of the invention and are not provided to limit the scope of the invention. Furthermore, the method described herein is not limited to the round-trip transmission of data between two electronic devices. Instead, the method can be modified and applied to the round-trip or non-round-trip transmission of data between three or more electronic devices. Accordingly, the disclosure of embodiments of the invention is intended to be illustrative of the scope of the invention and is not intended to be limiting. It is intended that the scope of the invention shall be limited only to the extent required by the appended claims.

What is claimed is:

1. A method of determining real-time data latency comprising:
    transmitting a first plurality of data packets, each having a first packet group identification (PGID) and a time stamp;
    receiving a set of data packets;
    identifying PGIDs in the set of data packets;
    identifying time stamps in each of the data packets in the set of data packets;
    using the time stamps to determine time delays for each of the data packets in the set of data packets;
    comparing the time delays of each of the set of data packets having the first PGID to a first minimum time delay and storing a time delay of a first data packet of the set of data packets having the first PGID as the first minimum time delay if the time delay of the first data packet of the set of data packets is less than the first minimum time delay;
    comparing the time delays of each of the set of data packets having the first PGID to a first maximum time delay and storing a time delay of a second data packet of the set of data packets having the first PGID as the first maximum time delay if the time delay of the second data packet of the set of data packets is greater than the first maximum time delay;
    summing a number of data packets in the set of data packets having the first PGID as a first total count;
    summing the time delays of the set of data packets having the first PGID as a first total time delay;
    updating a set of statistics based on at least the first total count, the first total time delay, the first minimum time delay, and the first maximum time delay.

2. The method of claim 1 further comprising:
    using the first PGID in storing the time delay of the first data packet of the set of data packets having the first PGID; and
    using the first PGID in storing the time delay of the second data packet of the set of data packets having the first PGID.

3. The method of claim 1 further comprising:
    locating the first PGID at a PGID offset in the data packets of the first plurality of data packets;
    wherein:
        the PGIDs in the set of data packets are located at the PGID offset in the set of data packets.

4. The method of claim 1 further comprising:
    locating a signature at a signature offset in the first plurality of data packets;
    comparing signatures in the set of data packets to the signature of the first plurality of data packets; and
    rejecting a first data packet of the set of data packets if a signature of the first data packet of the set of data packets fails to match the signature of the first plurality of data packets,
    wherein:
        the signatures in the set of data packets are located at the signature offset in the set of data packets.

5. The method of claim 1 wherein:
    the time stamps in the set of data packets originate from the time stamps in the first plurality of data packets.

6. The method of claim 1 further comprising:
    checking a validity of the set of data packets; and
    rejecting a first data packet of the set of data packets if the first data packet is invalid.

7. The method of claim 6 wherein:
    checking the validity of the set of data packets comprises:
        checking cyclic redundancy check values in the set of data packets; and
        checking sizes of the set of data packets to be within a predetermined range.

8. The method of claim 1 wherein:
    transmitting the first plurality of data packets occurs during a first time period; and
    receiving the set of data packets occurs during a second time period.

9. The method of claim 8 wherein:
    receiving the set of data packets further comprises providing the second time period overlapping with the first time period.

10. The method of claim 1 further comprising:
    transmitting a second plurality of data packets, each having a second packet group identification (PGID) and a time stamp;
    comparing the time delays of the set of data packets having the second PGID to a second minimum time delay;
    storing a time delay of a third data packet of the set of data packets having the second PGID as the second minimum time delay if the time delay of the third data packet is less than the second minimum time delay;
    comparing the time delays of the set of data packets having the second PGID to a second maximum time delay;
    storing a time delay of a fourth data packet of the set of data packets having the second PGID as the second maximum time delay if the time delay of the fourth data packet is greater than the second maximum time delay
    summing a number of data packets in the set of data packets having the second PGID as a second total count;
    summing the time delays of the set of data packets having the second PGID as a second total time delay;

wherein the set of statistics is further based on the second minimum time delay, the second maximum time delay, the second total count, and the second total time delay.

11. The method of claim 10 further comprising:
locating the first PGID offset in the first plurality of data packets;
locating a signature at a signature offset in the first plurality of data packets;
providing the first plurality of data packets with sizes in a predetermined range;
locating the second PGID at the PGID offset in the second plurality of data packets;
locating the signature at the signature offset in the second plurality of data packets; and
providing the second plurality of data packets with sizes in the predetermined range.

12. The method of claim 10 further comprising:
storing the time delay of the first data packet in a first array at a first memory address in a memory portion, the first memory address identified by the first PGID;
storing the time delay of the second data packet in the first array;
storing the time delay of the third data packet in a second array at a second memory address in the memory portion, the second memory address identified by the second PGID; and
storing the time delay of the fourth data packet in the second array.

13. The method of claim 10 further comprising:
storing the first total count in a first array at a first memory address in a memory portion, the first memory address identified by the first PGID; and
storing the second total count in a second array at a second memory address in the memory portion, the second memory address identified by the second PGID.

14. The method of claim 10 wherein the set of statistics comprises a first average time delay and a second average time delay, and the method further comprises:
determining the first average time delay by dividing the first total time delay by the first total count; and
determining the second average time delay by dividing the second total time delay by the second total count.

15. A method of determining real-time data latency comprising:
transmitting first and second pluralities of data packets from a first electronic apparatus during a first time period,
each data packet of the first and second pluralities of data packets comprising:
a time stamp indicating a time when the data packet was transmitted; and
a signature located at a signature offset within the data packet,
size of the data packet;
each data packet of the first plurality of data packets further comprising:
a first packet group identification (PGID) located at a PGID offset within the data packet; and
each data packet of the second plurality of data packets further comprising:
a second PGID different from the first PGID and located at the PGID offset within the data packet;
receiving a third plurality of data packets at the first electronic apparatus during a second time period;
identifying signatures in the third plurality of data packets;
comparing each of the signatures of the third plurality of data packets to the signature of the first and second pluralities of data packets;
rejecting a first data packet of the third plurality of data packets if a signature of the first data packet of the third plurality of data packets fails to match the signature of the first and second pluralities of data packets;
checking a validity of the third plurality of data packets;
rejecting a second data packet of the third plurality of data packets if the second data packet of the third plurality of data packets is invalid;
identifying PGIDs in the third plurality of data packets;
identifying time stamps in each of the data packets in the third plurality of data packets, each of the time stamps in the third plurality of data packets originating from the time stamps in the first and second pluralities of data packets;
using the time stamps to determine time delays for the third plurality of data packets;
comparing the time delays of each of the third plurality of data packets having the first PGID to a first minimum time delay and storing a time delay of a third data packet of the third plurality of data packets having the first PGID as the first minimum time delay if the time delay of the third data packet of the third plurality of data packets is less than the first minimum time delay;
comparing the time delays of each of the third plurality of data packets having the second PGID to a second minimum time delay and storing a time delay of a fourth data packet of the third plurality of data packets having the second PGID as the second minimum time delay if the time delay of the fourth data packet of the third plurality of data packets is less than the second minimum time delay;
comparing the time delays of each of the third plurality of data packets having the first PGID to a first maximum time delay and storing a time delay of a fifth data packet of the third plurality of data packets having the first PGID as the first maximum time delay if the time delay of the fifth data packet of the third plurality of data packets is greater than the first maximum time delay;
comparing the time delays of each of the third plurality of data packets having the second PGID to a second maximum time delay and storing a time delay of a sixth data packet of the third plurality of data packets having the second PGID as the second maximum time delay if the time delay of the sixth data packet of the third plurality of data packets is greater than the second maximum time delay;
summing a number of data packets in the third plurality of data packets having the first PGID as a first total count;
summing a number of data packets in the third plurality of data packets having the second PGID as a second total count;
summing the time delays of the third plurality of data packets having the first PGID as a first total time delay; and
summing the time delays of the third plurality of data packets having the second PGID as a second total time delay.

16. The method of claim 15 further comprising:
storing the time delay of the third data packet of the third plurality of data packets in a first array at a first memory address in a memory portion, the first memory address identified by the first PGID;

storing the time delay of the fourth data packet of the third plurality of data packets in a second array at a second memory address in the memory portion, the second memory address identified by the second PGID;

storing the time delay of the fifth data packet of the third plurality of data packets in the first array at the first memory address in the memory portion; and storing the time delay of the sixth data packet of the third plurality of data packets in the second array at the second memory address in the memory portion.

17. The method of claim 16 further comprising:
storing the first total count in the first array at the first memory address in the memory portion; and
storing the second total count in the second array at the second memory address in the memory portion.

18. The method of claim 17 further comprising:
storing the first total time delay in the first array at the first memory address in the memory portion; and
storing the second total time delay in the second array at the second memory address in the memory portion.

19. The method of claim 18 further comprising:
summing a number of bytes in the third plurality of data packets having the first PGID as a first byte count;
storing the first byte count in the first array at the first memory address in the memory portion;
summing a number of bytes in the third plurality of data packets having the second PGID as a second byte count; and
storing the second byte count in the second array at the second memory address in the memory portion.

20. The method of claim 15 further comprising:
determining a first average time delay by dividing the first total time delay by the first total count; and
determining a second average time delay by dividing the second total time delay by the second total count.

21. The method of claim 20 further comprising:
graphing the first minimum time delay, the first average time delay, the first maximum time delay, the second minimum time delay, the second average time delay, and the second maximum time delay.

22. The method of claim 15 wherein:
checking the validity of the third plurality of data packets comprises:
checking cyclic redundancy check values of the data packets in the third plurality of data packets; and
checking sizes of the data packets in the third plurality of packets to be within a predetermined range.

23. The method of claim 15 wherein:
receiving the third plurality of data packets during the second time period further comprises providing the second time period overlapping with the first time period.

24. The method of claim 15 further comprising:
providing the first PGID from the group consisting of a first internet protocol (IP) address, a first IP priority, a first data packet size, and a first protocol mix; and
providing the second PGID from the group consisting of a second internet protocol (IP) address, a second IP priority, a second data packet size, and a second protocol mix.

25. The method of claim 15 further comprising:
identifying the signatures further comprises:
identifying a signature in a first data packet of the third plurality of data packets before receiving any other data packets in the third plurality of data packets and before identifying a signature in any other data packets of the third plurality of data packets;
comparing the signatures further comprises:
comparing a signature of the first data packet of the third plurality of data packets before receiving the second data packet of the third plurality of data packets and before identifying a signature in any other data packets of the third plurality of data packets;
checking the validity further comprises:
checking the validity of the first data packet of the third plurality of data packets before receiving the second data packet of the third plurality of data packets and before checking a validity of any other data packets of the third plurality of data packets;
identifying the PGID further comprises:
identifying a PGID in the first data packet of the third plurality of data packets before receiving the second data packet of the third plurality of data packets and before identifying a PGID in any other data packets of the third plurality of data packets; and
identifying time stamps further comprises:
identifying a time stamp in the first data packet of the third plurality of data packets before receiving the second data packet of the third plurality of data packets and before identifying a time stamp in any other data packets of the third plurality of data packets.

26. An electronic apparatus for determining real-time data latency comprising:
a data packet reception portion to receive data packets;
a data packet signature verification portion coupled to the data packet reception portion, the data packet signature verification portion to verify signatures in the data packets;
a data packet validity verification portion coupled to the data packet reception portion, the data packet validity verification portion to verify a validity of the data packets;
a group identification portion coupled to the data packet reception portion, the group identification portion to identify PGIDs in the data packets;
a statistic array retrieval portion coupled to the data packet signature verification portion, the data packet validity verification portion, and the group identification portion, the statistic array retrieval portion to retrieve statistics stored in a memory;
a time delay determination and statistics portion coupled to the statistic array retrieval portion and the data packet reception portion, the time delay determination and statistics portion to
determining time delays for the data packets,
compare the time delays to the statistics, and
update the statistics; and
a statistic array storage portion coupled to the time delay determination and statistics portion and the group identification portion, the statistic array storage portion to store the statistics updated by the time delay determination and statistics portion.

27. The electronic apparatus of claim 26 further comprising:

a memory portion coupled to the statistic array storage portion and the statistic array retrieval portion.

28. The electronic apparatus of claim 27 wherein:

the memory portion is a dynamic random access memory; and the data packet reception portion, the data packet signature verification portion, the data packet validity verification portion, the group identification portion, the statistic array retrieval portion, the time delay determination and statistics portion, and the statistic array storage portion are located in a field programmable gate array.

29. The electronic apparatus of claim 26 wherein:

the data packet reception portion, the data packet signature verification portion, the data packet validity verification portion, the group identification portion, the statistic array retrieval portion, the time delay determination and statistics portion, and the statistic array storage portion are located in a field programmable gate array.

30. A method for determining in real-time a round-trip time delay for data packets comprising:

creating a plurality of outgoing data packets having an outgoing time stamp, a group identifier and validation information transmitting the outgoing data packets onto a network receiving a plurality of incoming data packets over the network validating the incoming data packets for each of the incoming data packets that is valid calculating a round-trip time delay for the incoming data packet updating statistics for the incoming data packets based on the round-trip time delay and the group identifier included in the incoming data packet.

31. The method of claim 30 wherein the validation information comprises a cyclic redundancy check value and the validating comprises:

determining that the incoming data packet is valid when the cyclic redundancy check value in the incoming data packet is accurate.

32. The method of claim 30 wherein the validating comprises:

determining that the incoming data packet is valid when a size of the incoming data packet is within a predetermined range.

33. The method of claim 30 wherein the validation information comprises an outgoing signature and the validating comprises:

determining that the incoming data packet is valid when an incoming signature included in the incoming data packet corresponds to the outgoing signature included in the outgoing data packets.

34. The method of claim 30 wherein the calculating comprises:

subtracting an incoming time-stamp included in the incoming data packet from a time of receipt for the incoming data packet, wherein the incoming time-stamp is a copy of the outgoing time-stamp.

35. The method of claim 30 wherein the updating comprises:

arranging the statistics based on the group identifier included in the incoming data packets.

36. The method of claim 30 wherein the statistics include at least three of a minimum round-trip delay, a maximum round-trip delay, a current incoming data packet round-trip delay, and an average round-trip delay.

37. The method of claim 36 wherein the statistics further include at least one of a current incoming data packet size, an average incoming data packet size, a minimum incoming data packet size, and a maximum incoming data packet size.

38. The method of claim 30 further comprising displaying the statistics.

39. The method of claim 30 further comprising displaying a graphical representation of the statistics.

* * * * *